(No Model.)
R. MELOY.
CLIP FOR VEHICLE WHEELS.
No. 308,622. Patented Dec. 2, 1884.
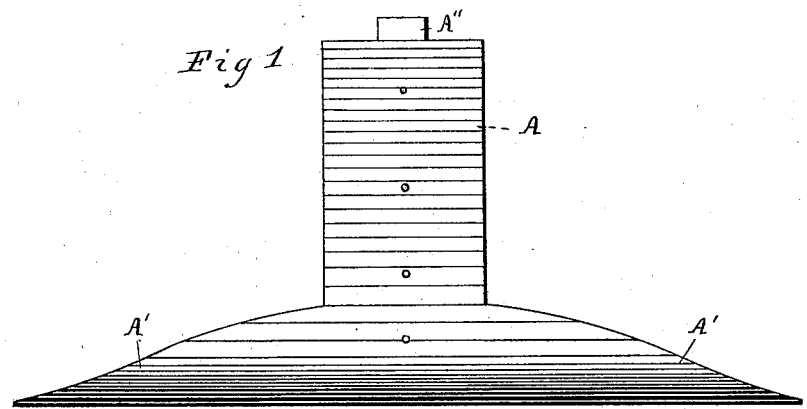
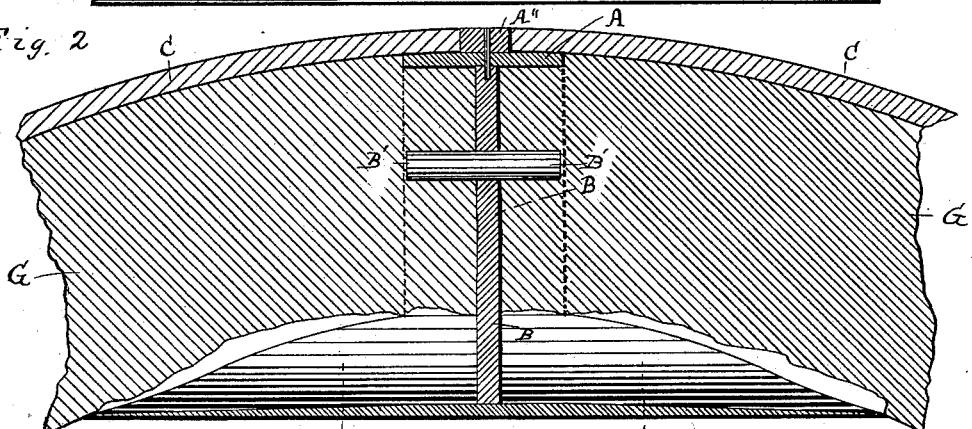
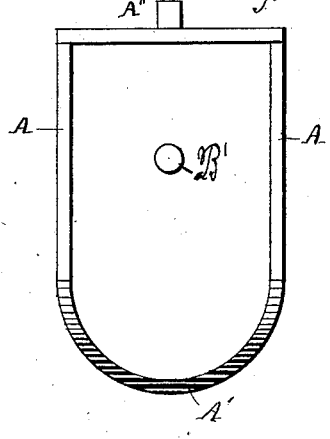
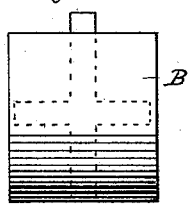
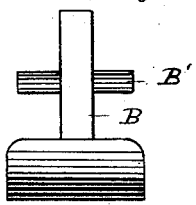
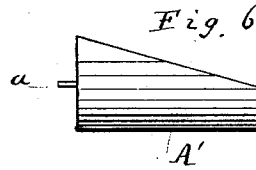
WITNESSES
Morton Toulmin
Edwin L. Bradford.
INVENTOR
Richard Meloy
Jos. H. Hunter
Attorney

UNITED STATES PATENT OFFICE.

RICHARD MELOY, OF MEMPHIS, INDIANA.

CLIP FOR VEHICLE-WHEELS.

SPECIFICATION forming part of Letters Patent No. 308,622, dated December 2, 1884.

Application filed April 22, 1884. (No model.)

*To all whom it may concern:*

Be it known that I, RICHARD MELOY, a citizen of the United States, residing at Memphis, in the county of Clark and State of Indiana, have invented certain new and useful Improvements in Clips for Wagon and Buggy Wheels, of which the following is a specification, reference being had therein to the accompanying drawings.

This invention relates to improvements in clips for wagon and buggy wheels, and has for its object to add to the strength of the joint in the fellies of wheels of wheeled vehicles. This object is attained by the device illustrated in the accompanying drawings, forming a part of this specification, in which—

Figure 1 is a detached view of a clip. Fig. 2 is a sectional view and shows the ends of fellies with some parts broken away. Fig. 3 is an end view. Fig. 4 is a modification. Fig. 5 is a modification in which the body A does not extend to the outside of the tire. Fig. 6 is a view of one of the end pieces, A'.

The letter A indicates the body of the clip, which is to be made, preferably, of malleable cast-iron.

A' are pieces of tapered form, which extend in each direction from the main or body portion of the clip, and are intended to fit over the rounded inner part of the fellies, and may form a part of the casting or be attached thereto by pins or dowels a.

B is a partition provided with dowels B', which enter suitable openings in the ends of the fellies G', which abut against each side of the partition.

The body A is of thin metal, and extends around the ends of the two fellies, and is provided with a lug, A'', which enters a suitably-shaped opening or slot in the tire C, and thereby prevents the tire from slipping off the periphery of the wheel.

Having described my invention, what I desire to secure by Letters Patent, and claim, is—

The combination, in a wheel, with a tire, C, having rectangular openings, of a clip, A, having rectangular lugs A'', adapted to fit into said openings, said clip having partition B, provided with pins B', and elongated tapering points A', with fellies G, substantially as described, and for the purposes set forth.

In testimony whereof I affix my signature in presence of two witnesses.

RICHARD MELOY.

Witnesses:
JAMES T. HIESTAND,
H. C. BRIDGEWATER.